T. H. & J. P. Bradish,
Making Teeth.
N° 17,775. Patented July 14, 1857.
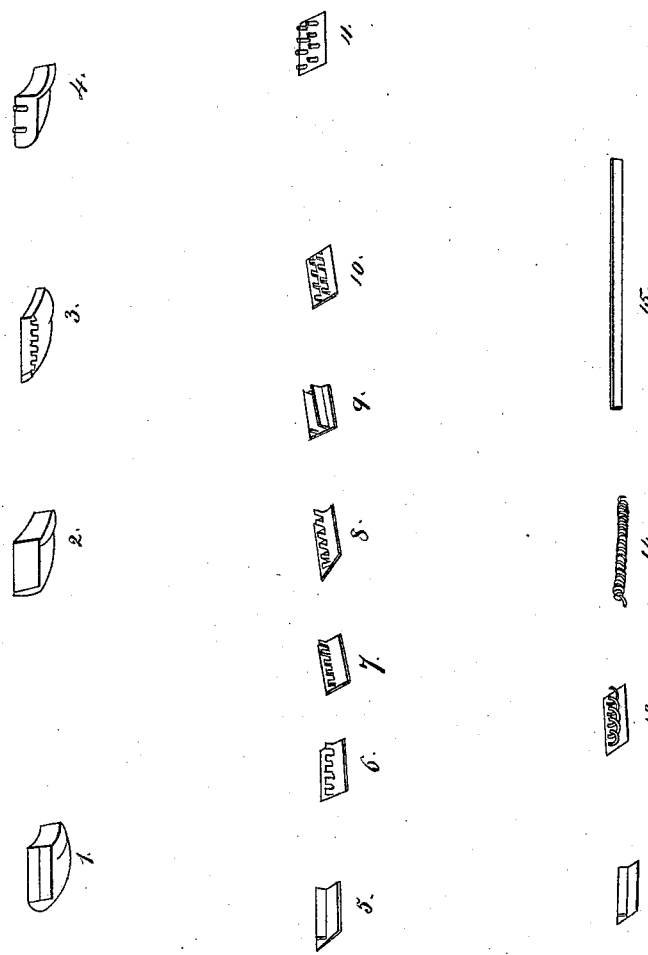
Witnesses:
Wm Baker,
Geo A Clark
Inventors
Theo H Bradish
James P. Bradish

UNITED STATES PATENT OFFICE.

THEO. H. BRADISH AND JAMES P. BRADISH, OF UTICA, NEW YORK.

FASTENING ARTIFICIAL TEETH TO METALLIC PLATES.

Specification of Letters Patent No. 17,775, dated July 14, 1857.

*To all whom it may concern:*

Be it known that we, THEODORE H. BRADISH and JAMES P. BRADISH, of the city of Utica, in the county of Oneida and State of New York, have invented a new and useful Improvement in the Manufacture of Artificial Teeth; and we do hereby declare that the following is a full and exact description thereof, reference being had to the drawings and to the letters of reference marked thereon.

The nature and object of our invention is to produce teeth with linings attached in the process of manufacturing, such linings being embedded in the plastic substance of which the tooth is formed at the time it is molded, the tooth being then hardened or vitrified, the lining is thereby fixed and becomes a part of the solid tooth, and to make this attachment of the lining more perfect and useful than has heretofore been done.

By the usual mode of manufacturing teeth, wire pins are embedded therein and project from the tooth, onto which pins the dentist has to fit the linings and secure them by hammering or heading down the pins and soldering them. Figure 4 is a specimen of such a tooth.

Attempts have been made to construct teeth with linings or rather partial linings attached in the manufacture, but owing to defects and imperfections which have not heretofore been surmounted, these attempts have not succeeded in producing such a lining as is desired, and as yet no solid tooth with a perfect and suitable sized lining attached has been successfully brought into use.

It is believed that the difficulties heretofore existing have been overcome by our invention, and we proceed to describe it.

In the drawings hereto annexed Figs. 6—7—8—10 and 13 exhibit specimens of the linings as by us constructed previous to their connection with the teeth; Figs. 1 and 2 exhibit specimens of finished teeth with the linings added; Fig. 3 represents a finished tooth which is bisected so as to show the manner in which the anchors or projecting points or pins are embedded into the material of the body of the tooth.

These linings are constructed by raising one or more longitudinal ridges or flanches on the surface of the metal (platina) which is to be in contact with the tooth by doubling up the thin metal so as to form a ridge of sufficient height and then dividing this ridge into separate anchors or points by sawing, punching, or cutting, as shown in Fig. 6, or by raising the ridge without doubling the metal, but by using thin strips, or suitable sized wire, which are passed through between a pair of rollers on the circumference of one of which is turned out one or more rectangular grooves or trenches of a sufficient depth and capacity corresponding to the height and thickness of the desired ridges or flanches into which the metal or wire is forced or pressed in passing between the rollers and afterward divided into points, as before described, and if more than one ridge is used the cut may be diagonal so as to bring the points in one series opposite the spaces in the other; the strip is then cut into the desired lengths for the linings.

A lining with a solid ridge formed but without being divided is shown in Figs. 9 and 10. Instead of two rollers being used to shape the metal, one roller may be used which will pass or travel over a horizontal bed plate having grooves or trenches cut in the surface of the bed plate into which the metal is forced and shaped by the roller passing over it, or the bed plate itself may be made to pass under the roller, producing the same result.

Instead of ridges or flanches, cylindrical points can be raised by passing the wire or metal between rollers or a roller and bed plate (as before described) in which, instead of trenches, one or more series of holes are drilled, into which holes the metal is forced or pressed; but these points or pins being cylindrical and smooth, will not probably furnish as secure a hold upon the substance of the tooth as the rougher points or cut pins made by cutting or punching the ridges, as before described.

The ridges may be cut into dovetail shaped anchors or pins as shown in Fig. 6 or set over like saw teeth as shown in Fig. 8. Various shapes may be given them but it will be found that the rough punched or cut anchors set over like saw teeth will give all the hold and security requisite. When larger linings are required two or more series of points or anchors may be formed so as to distribute them over the whole surface if desired.

This or similar linings may be made without the use of rollers or like machinery but by attaching the ridges or points to a thin strip of platina or other suitable metal with solder, composed of platina and silver or other alloy which will require a higher degree of heat to melt it than will be required for manufacturing the teeth or by the dentist when attaching them to the mouth plate.

Fig. 14 represents a coil of small platina wire which when soldered onto a strip of metal and the coil cut apart lengthwise will form a lining as shown in Fig. 13.

Fig. 15 shows a ridge or flanch which after being soldered to a strip can be cut or divided into any desired shaped points or anchors.

In attaching the linings to the teeth they are placed in the bottom of the mold, wherein the teeth are formed with the anchors or pins projecting upward and the soft material of the tooth is pressed into the spaces, and around the anchors as in the ordinary way of embedding nails, as now and heretofore done; the material of the tooth at the same time forming a close adhesion connection with the inner surface of the lining so as to entirely exclude the juices of the mouth or any foreign substance from collecting and causing any unpleasant odor or injury to the tooth.

To efforts heretofore made to construct teeth with linings it has been objected that the lining failed to cover a sufficient surface or extent of the tooth. Besides the embedding of an entire flanch or deep edge of the lining in the substance of the tooth weakens it by a continuous bisecting of its substance; whereas our separate anchors or points leave the substance of the tooth to connect between the points and is therefore stronger and better, and the lining may extend both in width and length to the extreme edges of the tooth. Our linings may also be made of metal as light and thin as can by possibility answer the purpose, thus affording the least possible hazard of expansion of the metal by heat or otherwise.

In fitting teeth to the mouth plate as they are now constructed (with two rivets to secure a lining) it often becomes necessary to cut or grind away the whole of one of the rivets and therefore the tooth is very liable to and often becomes loose and turns upon the remaining rivet or pin, and soon gives way entirely; whereas it is evident from the manner in which we attach the linings the dentist may cut away one-half or more of the whole length of the tooth. Still the remainder will be firm and can not give way. Even should the body of the tooth from any cause become fractured entirely across, it will still hold its parts securely as no considerable portion of the tooth will be dependent upon a single point or anchor on which it can turn. The whole surface of the lining being also vitrified upon it, will likewise sustain the parts in their places.

In using our linings a great amount of labor and time is saved to the dentist and all danger of fracturing the teeth after they are made is avoided, as far as lining them is concerned. Any requisite degree of heat may be used or applied so that the finest gold may be melted or flowed onto the lining, and the finest solder used in attaching them to the mouth plate.

We do not claim to be the first inventors of attaching linings or partial linings to artificial teeth at the time of manufacturing, although we are not aware that any plan for doing this has ever been brought into general use in any locality.

We are aware that a plate forming a tooth lining with its edges turned inward to form a hold within the substance of the tooth has been constructed, and the tooth molded upon this plate thus embedding the edges and forming a partial lined tooth.

We ourselves are the assignees and owners of the right of doing this, patented to George E. Murray, Dec. 4, 1849. But the lining in this case does not cover the whole tooth and can not, and by the continuous body of metal thus embedded the substance of the tooth is divided and weakened and is more liable to be fractured by expansion of the metal.

We do not herein claim this method as our invention. But

What we do claim as our invention and desire to secure by Letters Patent is—

The construction and attachment of the lining in the manufacture of artificial teeth by raising upon the back of the linings one or more series of separate anchors or projections being so formed that when these anchors or projections are embedded into the plastic material of the tooth, at the time of its molding shall constitute the solid tooth and lining combined, as described.

THEO. H. BRADISH.
JAMES P. BRADISH.

Witnesses:
WM. BAKER,
GEO. A. CLARK.